July 8, 1969    M. W. BOBOLTS ET AL    3,453,934
GUIDANCE SYSTEM FOR A THREE-DIMENSIONAL CONTOURING MACHINE
Filed Sept. 14, 1967

INVENTORS.
MELBOURNE W. BOBOLTS
LOUIS SIMON,
BY
Kimmel, Crowell & Weaver.
ATTORNEYS.

United States Patent Office 3,453,934
Patented July 8, 1969

3,453,934
GUIDANCE SYSTEM FOR A THREE-DIMENSIONAL CONTOURING MACHINE
Melbourne W. Bobolts, 5292 Berkshire, Detroit, Mich. 48224, and Louis Simon, 651 Vernier Road, Grosse Pointe Woods, Mich. 48236
Filed Sept. 14, 1967, Ser. No. 667,727
Int. Cl. B23c 1/16, 1/18
U.S. Cl. 90—13.2                5 Claims

ABSTRACT OF THE DISCLOSURE

A guidance system for a three-dimensional contouring machine which includes a reciprocably moving carriage which carries thereon a rotatably mounted splined shaft which slidably receives a slave arm and a control arm and to which are fixedly attached two rotatable pulleys and which further includes a continuous drive belt which is selectively secured either to the tops of the arms or to the top of one arm and to the bottom of the other arm such that movement of the control arm causes corresponding movement of the slave arm either to exactly duplicate the control arm movement or to duplicate by mirror image the movement of the control arm is disclosed.

BACKGROUND OF THE INVENTION

Field of the invention

The present invention relates to machines for cutting, milling, or otherwise forming objects and more particularly to a guidance system for permitting one three dimensional object to be copied exactly or in mirror image.

Description of the prior art

Machinery for carving or engraving materials including duplicating machinery is well known. For example, the Ryland patent, No. 511,712, discloses a machine for carving wood which is carried by a track. A sculpture copying machine is disclosed by the Wenzel patent, No. 653,494. A duplicate shaping machine for accomplishing the same general result as the present machine accomplishes is disclosed in the Jensen patent, No. 962,573. Copying instruments are disclosed in the patent to Lane, No. 1,142,585 and to Ridgway, Patent No. 1,684,887. A welding apparatus which has a control and follower is disclosed in the Dodge patent, No. 2,068,166. A photoelectric control and follower system is disclosed in the Cockrell patent, No. 2,261,644. An apparatus for treating the surfaces of articles which includes a control and follower is disclosed in the Breisch patent, No. 2,552,767. A contour cutting machine which includes a follower and cutting head is disclosed by the Davis et al. patent, No. 2,702,496 while a three dimensional pantographic reproduction machine is disclosed by Compton in Patent No. 2,742,823. The copying milling machine of the Sallwey et al. Patent No. 2,831,405 is similar in some respects to the present invention. Thus, the broad concept and principle upon which the present invention operates is known in the prior art; however, the devices of the prior art are generally very heavy and cumbersome and quite complicated. Because of the intricate movements, in some cases, the maintenance of high precision has been a serious problem. In addition, the machines of the prior art are quite limited in their utility and applicability. It is, accordingly, a princpal object of the present invention to provide an improved guidance system for a three dimensional contouring machine which is simpler, sturdier and more flexible than those of the prior art.

SUMMARY

The present invention may be described briefly, without intending to limit the scope of the invention, as a reciprocable carriage for following the contour of an object in one direction, a pivotal shaft on the carriage for following the contour of an object vertically perpendicular to the movement of the carriage, and a pair of relatively movable arms, a slave arm and a control arm, positioned on the shaft for movement perpendicular both to the direction of movement of the carriage and the vertical direction of movement of the arms to thereby permit following of the contour of a three dimensional object. The specific mechanism utilized is simpler and more flexible than those of the prior art and comprises, in essence, a pair of pulleys on either side of the arms with a continuous flexible belt passing over the pulleys and over the arms. The belt may be connected either to the tops or to the bottoms for producing an exact duplicate of a three dimensional object or the cord or belt may be connected to the top of one arm and to the bottom of the other arm to produce a mirror image of the object to be copied.

It is, accordingly, a primary object of the invention to provide a guidance system which may selectively produce either an exact duplicate of a three dimensional object or a mirror image of such an object.

An additional and important object of the invention is to provide a simplified guidance system for three dimensional contouring machines.

A further object of the invention is to provide a guidance system which includes a pair of pulleys and a continuous belt which is secured selectively to control and slave arms.

The specific disclosure of the drawings and of the specification constitutes an important object of the invention and other objects will be apparent from the specification and from the drawings.

Description of the preferred embodiment

Figure 1:
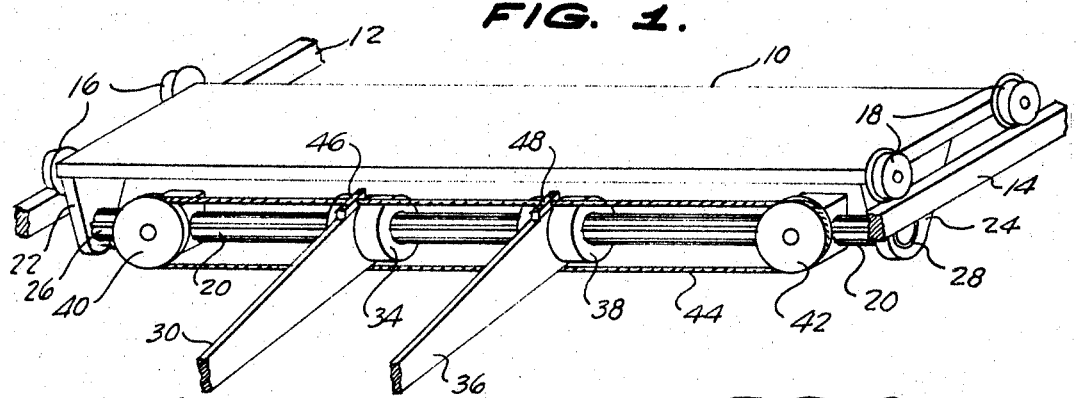
FIGURE 1 is a perspective view of the relevant facets of the present invention.
Figure 2:
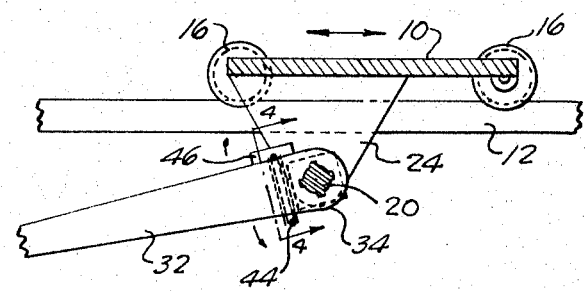
FIGURE 2 is an end view in cross-section of the invention of FIGURE 1 taken midway laterally of the carriage thereof.

The preferred embodiment of the present invention comprises a carriage 10 which is supported for reciprocable motion on tracks 12 and 14 by a pair of rollers 16 at one end and a similar pair of rollers 18 at the other end. The carriage movement on the tracks provides movement in one of the three dimensions.

Movement in the second of the three dimensions is provided by a splined shaft 20, or its equivalent, which is rotatably supported on the carriage by downwardly extending supports 22 and 24 into which the ends of the shaft are journalled as indicated at 26 and 28. A control arm 30 is slidably secured on the shaft 20 by means of a sleeve 34 and an arm 36 is slidably secured on the splined shaft 20 by means of a sleeve 38. The sleeves 34 and 38 are complementarily formed to fit over the splined shaft such that slidable movement longitudinal of the axis of the shaft is permitted but the arms are rotatably fixed with respect to the shaft such that rotation of the shaft by the control arm causes similar movement of the slave arm. Of course, a square, flatted or other shaft such as would permit sliding movement would be the full equivalent of the splined shaft.

Movement in the third dimension, longitudinally of the carriage and the shaft, is provided by means of a pair of pulleys 40 and 42 disposed at either end of the splined shaft on the respective sides of the arms. The pulleys 40 and 42 are fixedly mounted on the shaft such that they rotate about an axis fixed with respect to a given point on the shaft. A continuous member such as a cord or belt 44 extends around the pulleys 40 and 42 and around the upper and lower portions of the arms 30 and 36. As indicated in FIGURE 1, the cord may be secured by means of clamps 46 and 48 to the tops of the control arm 30 and the slave arm 36 such that when the control arm moves longitudinally of the shaft the slave arm moves a proportional distance.

Figure 3:
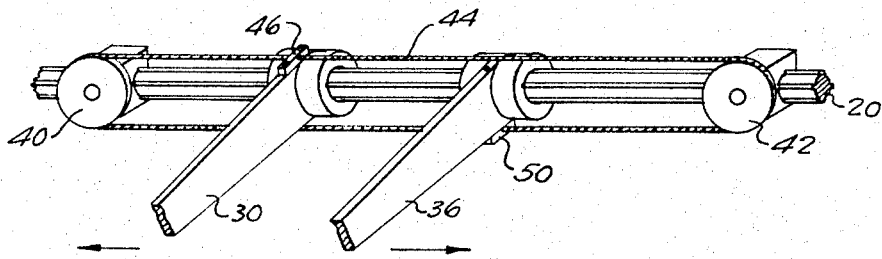
FIGURE 3 is a perspective view of the alternative connection of the guidance system to produce a mirror image of an object.
Figure 4:
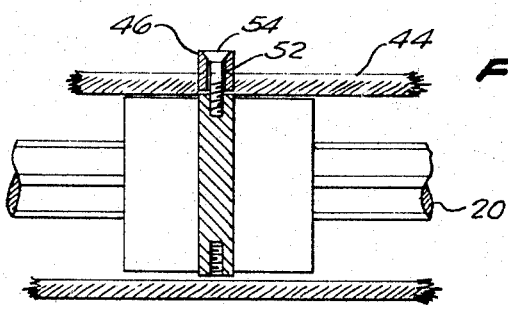
FIGURE 4 is a cross-sectional view in greater detail taken substantially along lines 4—4 in the direction of the arrows, as shown in FIGURE 2.

As shown in FIGURE 3, if the continuous flexible member 44 is secured at the top of the control arm 30 as by the clip 46 but is secured at the bottom of the slave arm 36, as indicated by the securing means 50, it will be apparent that movement of the control arm in one direction causes a proportional movement of the slave arm in the opposite direction. A detail of the clamping means is shown in FIGURE 4 wherein a clip 52 is secured in place by a screw or a plurality of screws indicated as 54.

As shown in FIGURE 1, an exact duplicate of a three dimensional object may be formed by causing the slave arm to follow the contour of the pattern. Movement in a first direction is provided by reciprocation of the carriage as a whole, movement in a second direction perpendicular thereto is provided by the vertical movement of the slave and control arms and movement in the third direction perpendicular to both the vertical movement and the movement of the carriage is provided by longitudinal movement of the arms along the shaft.

Where an exact duplicate is intended, the continuous flexible elongate member may be secured to the tops or to the bottoms of the arms and where the object to be made is of the mirror image of the pattern, the elongate flexible member would be secured to the top of one arm and to the bottom of the other, as shown in FIGURE 3.

In use, a follower is provided on the slave arm. Such a follower may be of any conventional type such as those shown in United States Patents No. 2,831,405 and 2,742,823, previously referred to. Any type of follower may be used such as those disclosed in the other patents referred to since the type of follower constitutes no part of the present invention. A machining or cutting tool is secured to the slave arm 36. Similarly, since the exact nature of the forming tool is of no consequence with respect to this invention, any type may be used such as that disclosed in United States Patent No. 2,831,405 or in any of the other patents referred to hereinbefore.

The follower secured to the slave arm is caused to follow the contour of a three dimensional object and the cutting or machining tool on the slave arm forms a similar contour on the object to be formed.

The great advantage of being able to cause the slave arm to move correspondingly with the control arm either in the same direction or in the opposite direction is that the mirror image of a pattern may be formed. For example, where a left-handed object is to be made from a right-handed pattern, the task may easily be accomplished merely by arranging the method of connecting the flexible member to the arms.

It will be seen that the construction disclosed is rugged, light-weight, and highly precise since there are no points at which movement may be lost, as is the case with many of the devices of the prior art.

Several advantages will be apparent to those skilled in the art from the foregoing disclosure and from the drawings and the field of applicability is limited only by the imagination of the user.

The invention has been described with respect to an exemplary embodiment and has been abstracted, summarized and disclosed with respect to a specific embodiment; however, it will be understood that the disclosed embodiment is not limiting but is merely exemplary, and that the scope of the invention is defined by the appended claims and the departures from the exact construction disclosed may be made without departing from the spirit of the invention.

We claim:

1. A three-dimensional contouring machine which comprises:
   a carriage;
   means mounting the carriage for translational movement in a first direction;
   an elongate shaft;
   means mounting the shaft on the carriage for relative pivotal movement vertically with respect to the shaft;
   a control arm;
   means mounting the control arm on the shaft for relative longitudinal movement, said mounting means fixing the relative vertical movement of the control arm with respect to the shaft;
   a slave arm;
   means mounting the slave arm on the shaft for relative longitudinal movement, said mounting means fixing the relative vertical movement of the slave arm with respect to the shaft and to the control arm; and
   means interconnecting the slave arm and the control arm for causing proportional movement of the slave arm with respect to the control arm as the slave arm is moved longitudinally of the shaft.

2. The machine of claim 1 wherein the interconnecting means comprises:
   means for selectively interconnecting the control arm and the slave arm to cause the slave arm to duplicate the movement of the control arm or to cause the slave arm to trace a mirror image of the movement of the control arm parallel to the axis of the shaft.

3. The machine of claim 2 wherein the interconnecting means comprises:
   a pair of pulleys secured on either side of the arms to the shaft for rotating about fixed axes with respect to the shaft and for being pivoted by the shaft;
   a continuous flexible member extending about the pulleys; and
   means selectively connecting the flexible member to selected points on the respective arms such that movement of the control arm causes a proportional movement of the slave arm, said motion being transmitted by said flexible member.

4. The machine of claim 3 wherein the flexible member passes over the pulleys and the top portions of the arms in one direction and under the pulleys and bottom portions of the arms in the other directions and wherein the connecting means constructed and disposed to connect the flexible member to the same portion of each arm or to the top portion of one arm and to the bottom portion of one arm as described to thereby permit exact duplication of movement or mirror image duplication of movement of the slave arm and the control arm.

5. The machine of claim 4 wherein the means mounting the carriage for translational movement comprises:
   a pair of spaced fixed tracks disposed perpendicularly to the axis of the shaft; and
   guide members on the carriage for guiding and carrying the carriage along the tracks.

References Cited

UNITED STATES PATENTS 511,712   12/1893   Ryland _____ 90—13.1 XR
2,962,942   12/1960   Laurent _____ 90—13.1 XR GERALD A. DOST, *Primary Examiner.*